United States Patent [19]

Shelby et al.

[11] Patent Number: 4,698,012
[45] Date of Patent: Oct. 6, 1987

[54] MULTI-STATION ROTARY BLOW MOLDING MACHINE

[76] Inventors: Richard K. Shelby, 160 Briarwood N., Oak Brook, Ill. 60521; Robert G. Nutting, Glenview, Ill. 60025

[21] Appl. No.: 778,411

[22] Filed: Sep. 20, 1985
(Under 37 CFR 1.47)

[51] Int. Cl.$^4$ .......................................... B29C 49/64
[52] U.S. Cl. ..................... 425/526; 264/523;
264/543; 425/540; 425/541
[58] Field of Search ............... 425/526, 535, 536, 538,
425/539-541, DIG. 231; 264/523, 528, 543

[56] References Cited

U.S. PATENT DOCUMENTS

| | | | |
|---|---|---|---|
| 3,611,484 | 10/1971 | Lecluyse et al. | 425/526 |
| 3,652,751 | 3/1972 | Criss et al. | 425/526 X |
| 3,764,250 | 10/1973 | Waterloo | 425/540 X |
| 3,785,761 | 1/1974 | Logomasini et al. | 425/540 |
| 3,963,404 | 6/1976 | Pollock et al. | 425/540 X |
| 4,005,966 | 2/1977 | Nutting | 425/539 X |
| 4,427,360 | 1/1984 | Albrecht et al. | 425/541 |
| 4,432,720 | 2/1984 | Wiatt et al. | 425/535 X |
| 4,605,368 | 8/1986 | Hellmer et al. | 425/540 X |
| 4,648,831 | 3/1987 | Johnson | 425/541 X |
| 4,650,412 | 3/1987 | Windstrup et al. | 264/543 X |

FOREIGN PATENT DOCUMENTS

| | | | |
|---|---|---|---|
| 219796 | 1/1959 | Australia | 425/539 |
| 8101679 | 6/1981 | PCT Int'l Appl. | 425/539 |

*Primary Examiner*—Richard L. Chiesa
*Attorney, Agent, or Firm*—Lee, Smith & Zickert

[57] ABSTRACT

A multi-station rotary blow molding machine having a plurality of separable blow molds angularly arranged in a serial fashion in a circular array within the machine. Each mold is comprised of two mold sections mounted for simultaneous movement toward and away from one another in a direction generally parallel to the rotational axis of the machine. An air supply manifold is provided for supplying air for both blowing articles and controlling certain portions of the molding machine for predetermined portions of a revolution of the molding machine. The mold sections are cooled in groups, each of the sections having an internal fluid path with adjacent mold sections being interconnected so that cooling fluid is passed serially between adjacent mold sections of each group.

28 Claims, 21 Drawing Figures

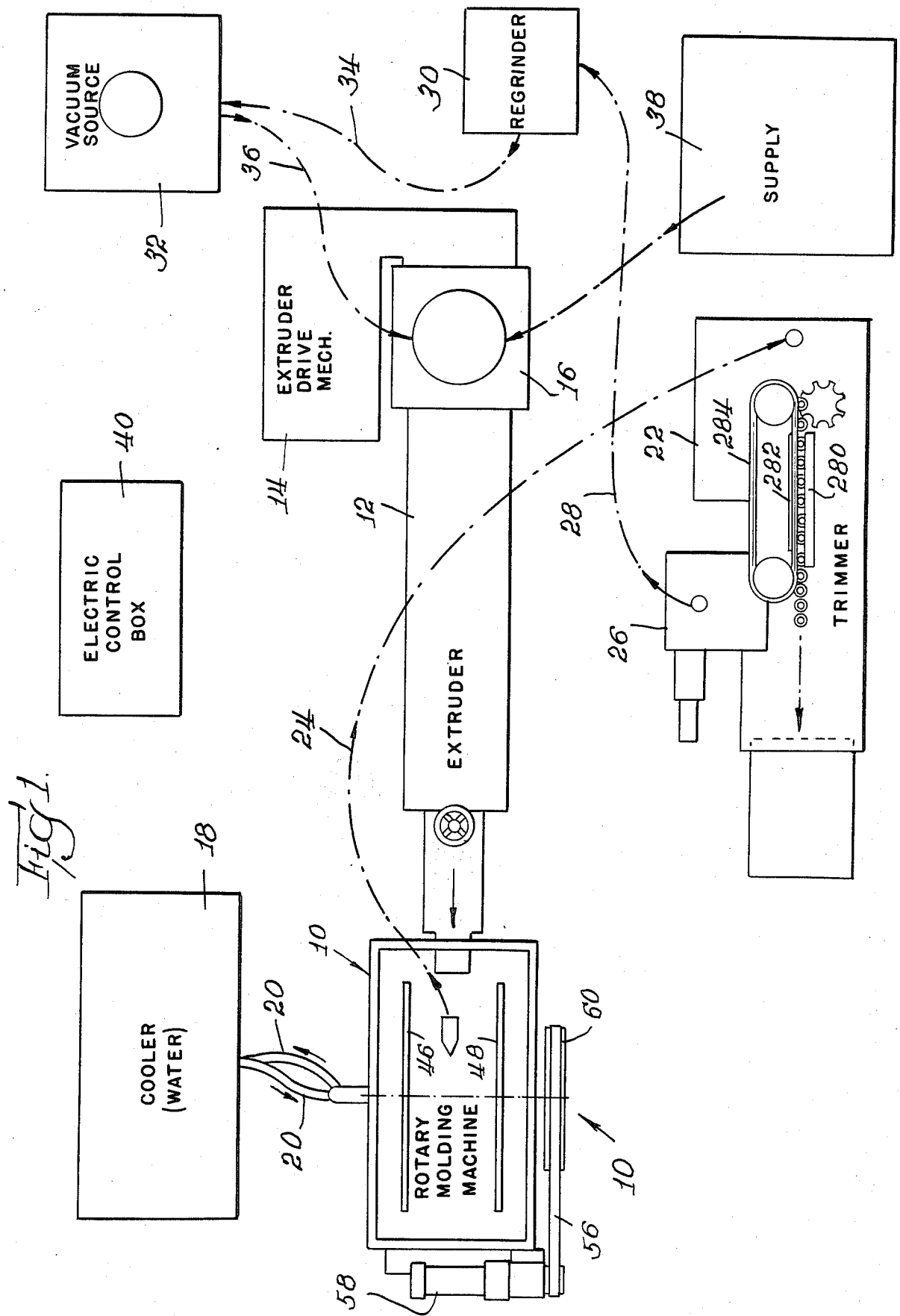

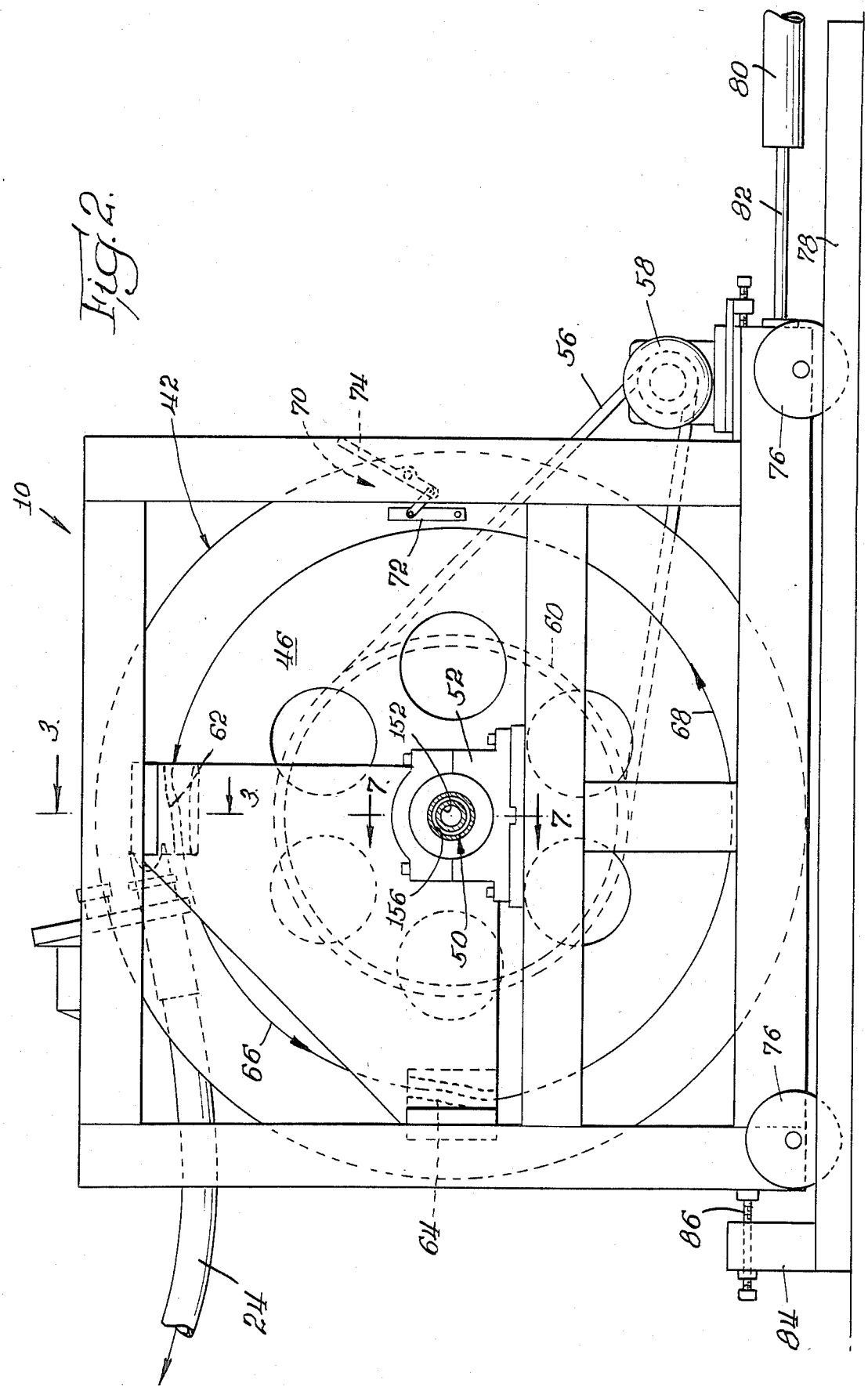

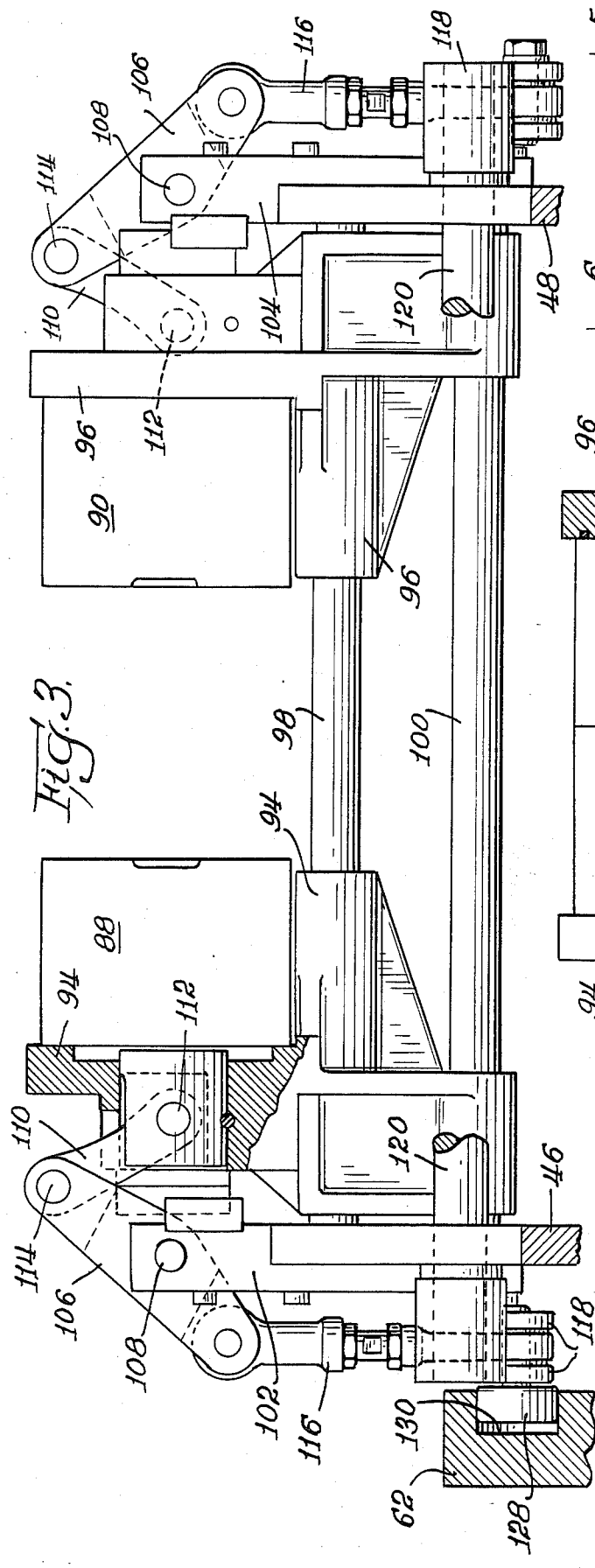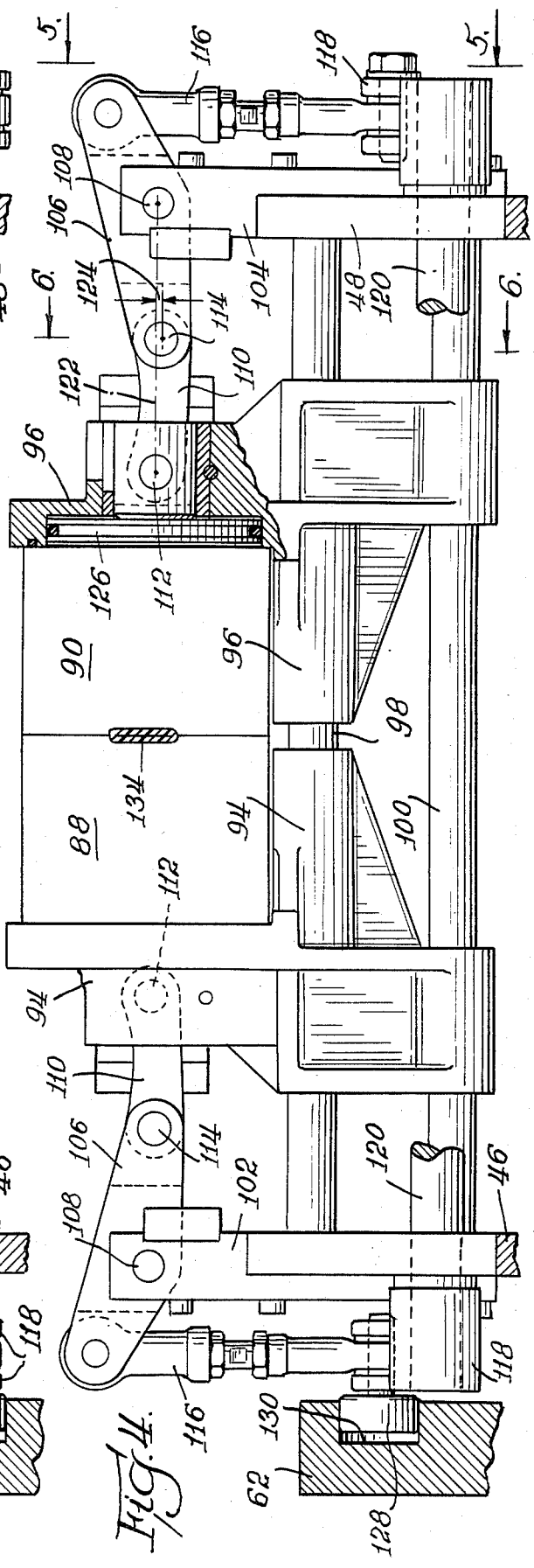

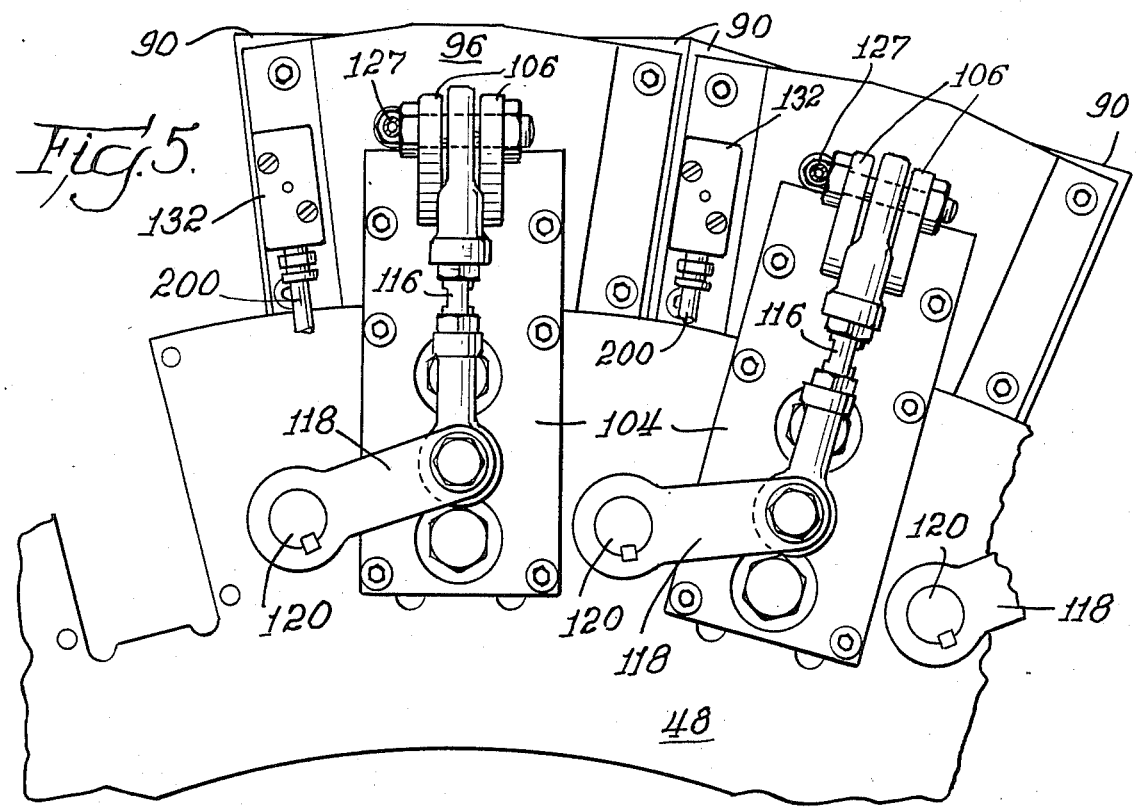
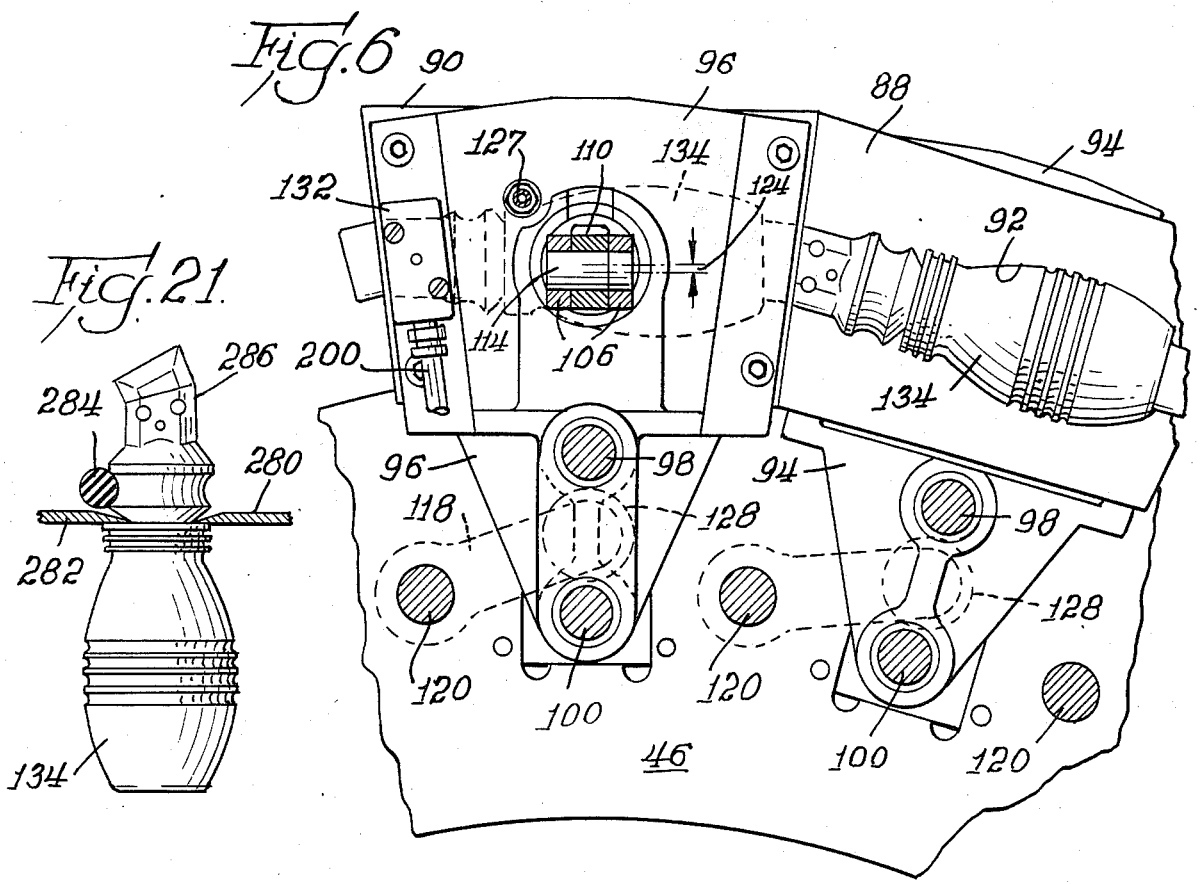

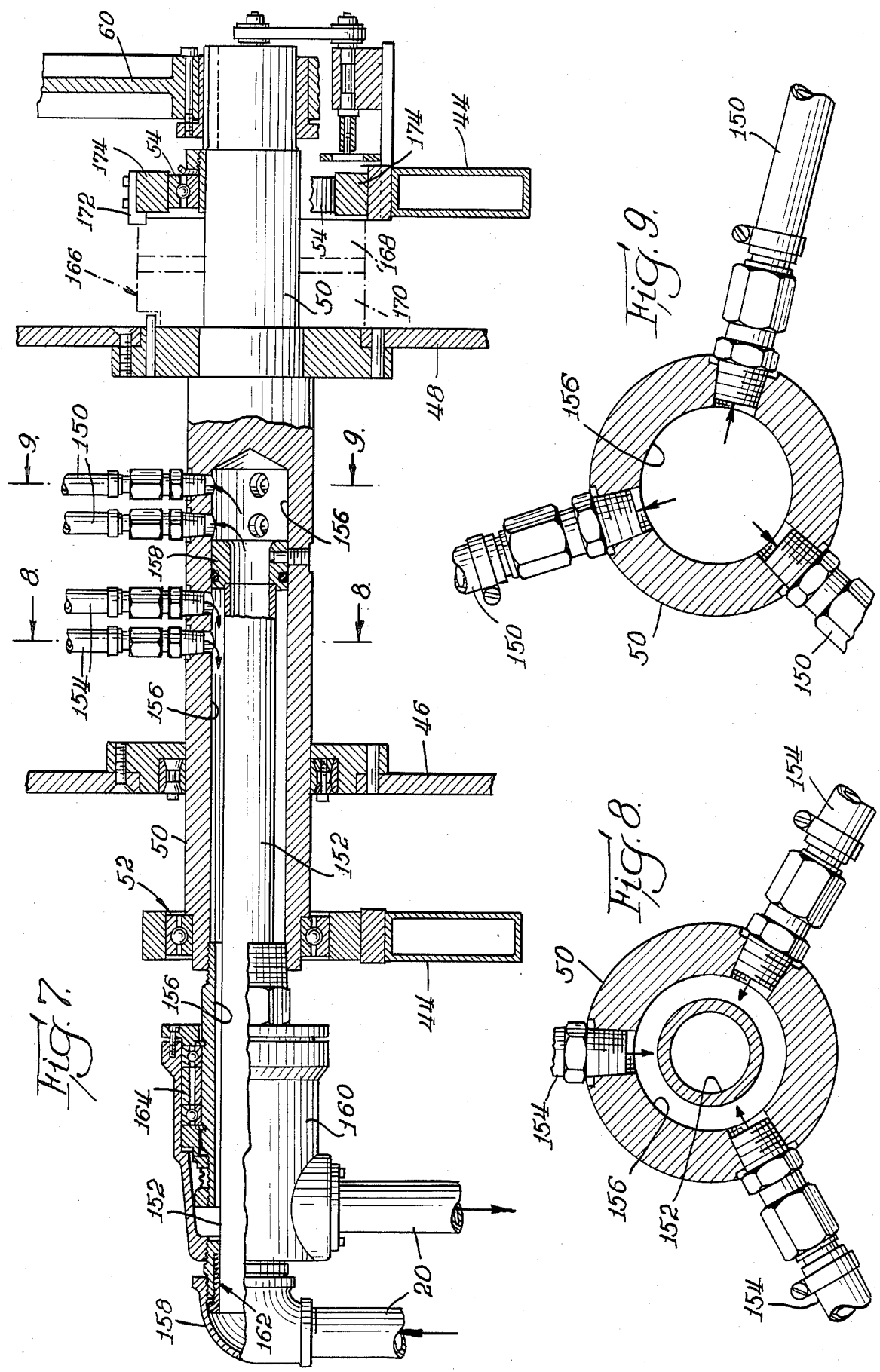

MULTI-STATION ROTARY BLOW MOLDING MACHINE

BACKGROUND OF THE INVENTION

This invention relates to a multi-station rotary blow molding machine, and in particular to a rotary blow molding machine which can be operated continuously at a rapid speed.

Blow molding machines for manufacture of thin-walled plastic articles are well known. For example, U.S. Pat. No. 3,785,761, having a common inventor with the present invention, discloses a rotary blow molding machine which includes a plurality of blow molds having one mold half which is opened radially outwardly during rotation of the machine. While the machine of this patent was an improvement over then-existing rotary molding machines, it suffers deficiencies which prevent a high speed operation of the machine. In high volume businesses which require large numbers of plastic articles to be produced on a daily basis, the higher the production volume of a machine, the fewer machines that are required to fulfill daily production needs, thus reducing capital investments.

SUMMARY OF THE INVENTION

The present invention is directed to an improved multi-station rotary blow molding machine having a rotary mold frame supported in a stationary support frame and which, due to its configuration, can be operated at a considerably increased speed, thus increasing the production of the machine per unit of operating time. The machine includes a plurality of separable blow molds which are angularly arranged in a circular array in the mold frame about a central shaft having a central axis. Each mold comprises a pair of mold sections, each of which has an internal cavity with the internal cavities of the mold sections, when joined, defining the external configuration of a molded article. The mold sections are mounted in the mold frame for movement toward and away from one another in a direction generally parallel to the axis of the central shaft, and are separately opened and closed as necessary during molding or cleaning operations.

An air supply manifold is provided to distribute air for blowing articles and controlling certain portions of the molding machine. Air is supplied for predetermined portions of a revolution of the machine. Each mold section is cooled by a fluid, such as water, and has an internal flow path, with the flow paths of adjacent mold sections being interconnected to pass cooling fluids serially between adjacent mold sections. Certain of the mold sections are grouped into a cooling circuit, with several of the cooling circuits being employed in the machine.

Each of the mold sections is mounted in a carriage which in turn is connected to and slideable upon a pair of spaced rods which are secured to the rotary mold frame. Preferably, each of the mold sections is removably fastened to its respective carriage in order to permit change of the mold sections to allow fabrication of thin-wall plastic articles of different sizes and shapes.

In order to open and close the mold sections, a cam arrangement is used including a cam which is attached to the stationary support frame, a cam follower which is associated with each of the pairs of mold sections and carried by the rotary mold frame, and a linkage for linking each of the cam followers to its respective mold sections. The cam comprises a segmented cam track, with a first segment of the track being shaped to cause closing of each pair of mold sections and a second segment of the track, spaced from the first segment, being shaped to cause opening of each pair of mold sections. For cleaning or inspection purposes, the invention also includes a shiftable cam track segment which is interposed between the first and second track segments. The shiftable cam track segment is normally located in a position preventing engagement with the cam followers of the blow molds, but is able to be relocated to engage each cam follower and open each pair of mold sections before engagement of the cam follower by the second segment of the cam track which normally performs that operation.

The linkage between the cam follower and each associated mold section includes a toggle which is secured to each mold section and has a central pivot which is attached to the mold frame. A pivotable arm is located between each mold section and its associated toggle, the arm having a first pivot which is attached to the mold section and a second pivot which is attached to one end of the toggle. The toggle is pivotally positionable about its central pivot in one of two orientations, a first orientation at which the second pivot connecting the toggle to the arm is raised and the mold sections are opened away from one another, and a second orientation in which the second pivot is lowered and the mold sections are closed against one another. The second orientation is an over-the-center orientation such that the center of the pivot connecting the arm and the toggle is passed through a line between the center of the first pivot of the arm and the central pivot of the toggle as the toggle is pivoted between the first and second orientations.

The linkage also includes a rotatable tie rod secured to each cam follower and extending through the mold frame between each pair of mold sections. The tie rod in turn is linked to each toggle in order to position the toggle between the first and second orientations.

The air supply manifold consists of two basic parts, a stationary first portion secured to the stationary support frame and a rotatable second portion which is secured to the rotatable mold frame. The first portion of the manifold is urged into sealing engagement with the second portion by means of an annular piston which is disposed within an annular channel in the first portion. The piston bears against the support frame, and pressurized air is introduced between the piston and the annular channel in order to force the first portion into sealing engagement with the second portion.

The first portion of the manifold includes a series of annular channels which communicate with the second portion. Each annular channel includes a pressure segment and an exhaust segment, with each segment occupying a predetermined sector of each annular channel. In communication with the channels, the second portion of the manifold includes a plurality of spaced groups of air distribution conduits, with each group being associated with one of the blow molds.

The rotary mold frame is driven by a motor which is attached to the stationary support frame. An endless belt connects the motor to the mold frame.

BRIEF DESCRIPTION OF THE DRAWINGS

The invention is described in greater detail in the following description of an example embodying the best mode of the invention, taken in conjunction with the drawings, in which:

FIG. 1 is a schematic block representation of a molding system employing a rotary blow molding machine according to the invention, FIG. 2 is an enlarged side elevational illustration of a rotary blow molding machine according to the invention, FIG. 3 is an enlarged cross-sectional illustration taken along lines 3—3 of FIG. 2 and showing the mold sections in an open orientation, FIG. 4 is a view similar to FIG. 3, but showing the mold sections in a closed orientation, FIG. 5 is a partial elevational illustration of the mold opening and closing linkages taken along lines 5—5 of FIG. 4, FIG. 6 is a cross-sectional illustration taken along lines 6—6 of FIG. 5, with portions of one mold removed to illustrate elements in the rear, FIG. 7 is an enlarged cross-sectional view, with parts broken away, taken along lines 7—7 of FIG. 2, FIG. 8 is a further enlarged cross-sectional view taken along lines 8—8 of FIG. 7, FIG. 9 is also an enlarged cross-sectional illustration taken along lines 9—9 of FIG. 7, FIG. 21 is an elevational view of a molded article according the invention as an upper excess portion is being trimmed therefrom in the trimmer represented in FIG. 1.

DESCRIPTION OF AN EXAMPLE EMBODYING THE BEST MODE OF THE INVENTION

Figure 12:
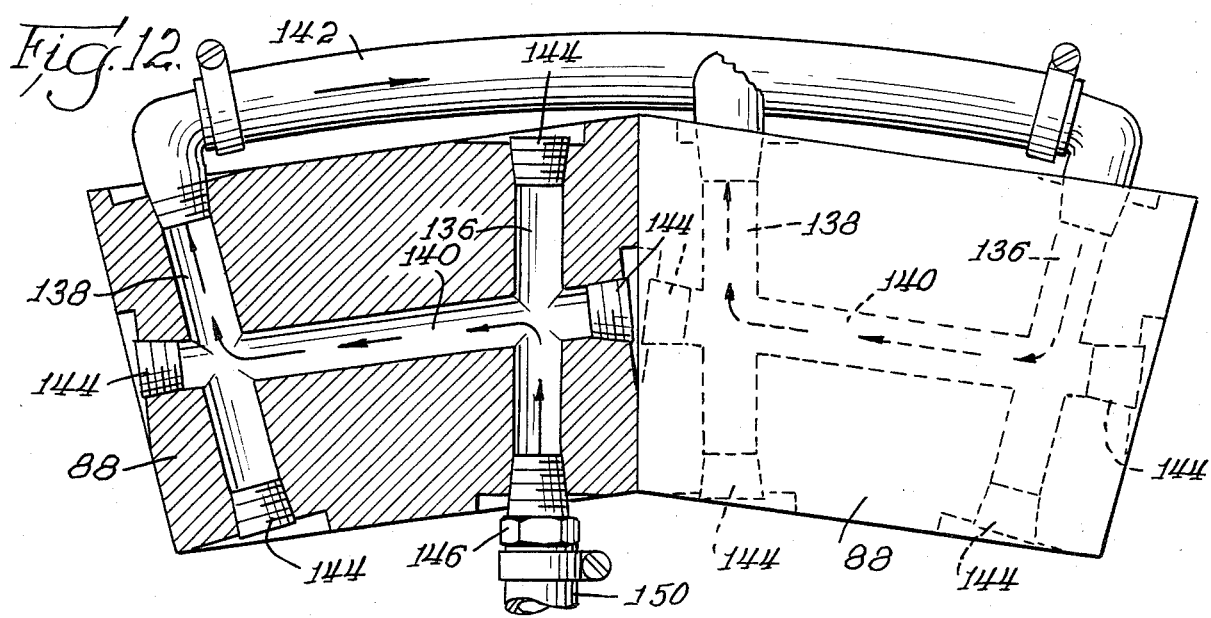
FIG. 12 is an enlarged cross-sectional view taken along the lines 12—12 of FIG. 11.
Figure 11:
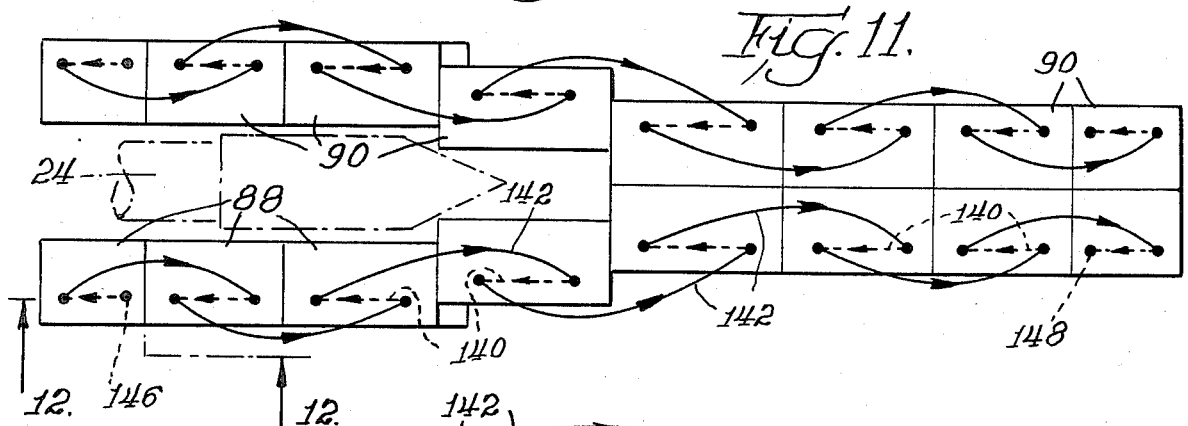
FIG. 11 is a top view of FIG. 10 showing some of the mold sections in an open orientation.

A schematic overview of a full blow molding line is shown in FIG. 1. A rotary blow molding machine 10 according to the invention is fed an extruded parisan by an extruder 12 driven by a drive mechanism 14. A hopper 16 is used to store plastic for the extruder 12 and supply plastic as needed.

A cooler 18 is used to supply needed cooling water to the blow molding machine 10. As shown, the cooler 18 is connected to the blow molding machine 10 by means of supply and return lines 20.

Molded plastic articles are transported from the molding machine 10 to a trimmer 22 by means of a conveyor 24. Preferably, the conveyor 24 is a hollow tube maintained under a vacuum for rapid transportation of formed articles directly to the trimmer 22.

The trimmer 22 receives molded plastic articles and trims excess mold portions therefrom. The excess portions are collected in a hopper 26 and then are conveyed via a line 28 to a regrinder 30 where the trimmings are ground into a suitably small size before being reintroduced into the hopper 16 for remelting and reuse.

A vacuum source 32 is used to supply necessary vacuum to all conveying lines of the invention. Although not shown in any detail, the vacuum source 32 provides necessary vacuum to the conveyor 24, the line 28 and lines 34 and 36 leading from the regrinder 30 to the vacuum source 32 and from the vacuum source 32 to the hopper 16, respectively. A supply 38 is used to provide needed raw materials to the hopper 16. An electrical control box 40 is connected to all of the various elements of the invention shown in FIG. 1 in order to provide electrical power and control for the elements, as needed. For the sake of simplicity in FIG. 1, various electrical connections have been omitted.

FIG. 2 illustrates the rotary blow molding machine 10 in greater detail. The molding machine 10 is composed of two basic portions, a rotary mold frame 42 and a stationary support frame 44. The rotary mold frame 42 is composed of a pair of circular vertical plates 46 and 48 (also partially shown in FIGS. 3, 4 and 7) which are mounted upon a central shaft 50 which rotates within bearings 52 and 54 carried by the stationary support frame 44 (as best shown in FIG. 7).

The rotary mold frame 42 is driven by means of a belt 56 connected to a motor 58 mounted on the support frame 44. The belt 56 extends about an enlarged pulley wheel 60, shown partially in FIG. 7, which is secured to the central shaft 50.

The rotary mold frame 42 carries a series of blow molds which are shown and described in greater detail below in connection with Figures 3 through 6. For opening and closing the blow molds, a segmented cam track, comprising a first cam segment 62 and a second cam segment 64, is secured to the stationary support frame 44. In the counter-clockwise direction with relation to FIG. 2, the cam segment 62 is positioned to open the blow molds with the blow molds remaining open over an arcuate path 66 until being closed by the cam segment 64. Following closing by the cam segment 64, the blow molds remain closed over an arcuate path 68 extending approximately 270° from the first cam segment 62.

It is often desired to open the blow molds prematurely before reaching the first cam segment 62. To that end, a shiftable cam track segment 70 is located in the support frame 44 upstream (assuming counter-clockwise rotation in FIG. 2) from the first cam segment 62. The cam segment 70 includes a track portion 72 which is normally located out of the path 68. Manipulation of a lever 74 can place the track segment 72 in the path 68 in order to open the blow molds.

As shown in FIG. 2, the conveyor tube 24 is positioned to remove molded articles from the blow molding machine 10. The frame 44 is carried by a series of wheels 76 on a track 78. A cylinder 80 with an extensible ram 82 attached to the frame 44 is used to translate the molding machine 10 to and fro on the track 78. A stop 84 on the track 78, having an adjustable abutment 86, assures proper positioning of the molding machine 10 in the operational orientation shown in FIG. 2.

FIG. 3 through 6 illustrate the blow molds and associated operating and mounting structures. Each of the blow molds is composed of a pair of mold sections 88 and 90 having an internal cavity (cavity 92 of a mold section 90 being shown in FIG. 6). The internal cavities of the mold sections 88 and 90 define the external configuration of an article molded by the blow molding machine 10. Each of the molds 88 and 90 is mounted in a respective carriage 94 and 96 which is connected to and slideable upon a pair of spaced rods 98 and 100 secured to mounting blocks 102 and 104 affixed to the respective plate 46 and 48.

The carriages 94 and 96 are driven back and forth upon the spaced rods 98 and 100 by means of identical linkages. Each linkage is composed of a toggle 106 having a central pivot and attachment point 108 secured to a respective mounting block 102 or 104. Each toggle 106 is connected to its respective carriage 94 or 96 by a pivotable arm 110 having a first pivot 112 attached to the carriage 96 and a second pivot 114 attached to an end of the toggle 106. An adjustable linkage 116 extends from the opposite end of the toggle 106 to an arm 118 which, in turn, is attached to a rod 120 extending between the linkage mechnisms of the opposite mold sections 88 and 90 of each blow mold. The rod 120 is broken away in FIGS. 3 and 4 for clarity purposes. As is evident from the interconnection of the toggle 106, arm 110, linkage 116 and arm 118, rotation of the rod 120 causes simultaneous movement of the carriages 94 and 96, and consequently the mold sections 88 and 90, toward and away from one another.

As best shown in FIG. 4, when the mold sections 88 and 90 are closed, the toggle 106 is located in an over-the-center orientation. Extending a line 122 between the first pivot 112 and the central pivot 108, it is seen that the center of the second pivot 114 has passed through the line 122 by a distance 124. The over-the-center orientation maintains the closed position of the molds 88 and 90, for internal pressure within the mold sections 88 and 90 enhances the locking of the mold due to the orientation of the toggles 106.

Firm closure of each of the mold sections 88 and 90 against one another is ensured by an internal piston 126 disposed within a cavity in each of the carriages 96. Air pressure between the piston 126 and the carriage 96, introduced through an inlet 127 (FIGS. 5 and 6) pushes the mold section 90 into firm engagement with the mold section 88, substantially preventing any extrusion of plastic at the interface of the two mold sections during the blow molding operation.

A cam follower 128 is attached to each arm 118 on the side of the rotary mold frame at which the cam segments 62 and 64 are secured within the support frame 44. The cam follower 128 traverses a track 130 within the cam segment 62 (and a similar track within the cam segment 64) rotating the arm 118 to which it is attached, thus rotating the rod 120 and opening or closing the mold sections 88 and 90, depending upon which cam segment 62 or 64 is being traversed. It should be evident that because of the identical linkages involved for each of the carriages 94 and 96 of the respective mold sections 88 and 90 that the mold sections 88 and 90 are translated toward and away from each other simultaneously and in a balanced manner so that each mold section 88 and 90 traverses an identical distance before joining the other. The direction of movement of the mold segments 88 and 90 is generally parallel to the axis of the central shaft 50.

As is conventional, each of the blow molds must carry a needle which, when the mold sections 88 and 90 are closed, pierces the plastic parisan captured between the mold sections in order to inflate the parisan to conform to the internal configuration of the mold sections. A needle housing 132 is shown in FIGS. 5 and 6, the details of any needles being omitted (with the exception of a schematic representation in FIG. 20) and a conventional blowing needle may be employed. As discussed below, the needle contained within the needle housing 132 is extended and retracted by applied air pressure.

As shown in FIG. 6, when a plastic parisan has been captured between the mold sections 88 and 90 and inflated, a container 134 is created within the cavity formed between the mold sections 88 and 90. Although not illustrated, but as is conventional, each of the mold sections 88 and 90, when closed, contain blades to separate succeeding containers 134 from one another so that when the mold sections 88 and 90 are opened, the containers 134 may be stripped from the mold sections and transported by the conveyor 24 for downstream handling.

As is well know in the blow molding industry, each of the molds 88 and 90 must be chilled sufficiently so that the plastic parisan, when blown to form the container 134, solidifies sufficiently to be removed from the mold sections 88 and 90 when they are opened during the rotary cycle of the molding machine 10. In accordance with the present invention, a plurality of mold sections are grouped together and cooled in a circuit formed by the group. While the majority of the following discussion will be with regard to a grouping of the mold sections 8, it will be understood that the description is equally appropriate to the mold sections 90.

Figure 10:
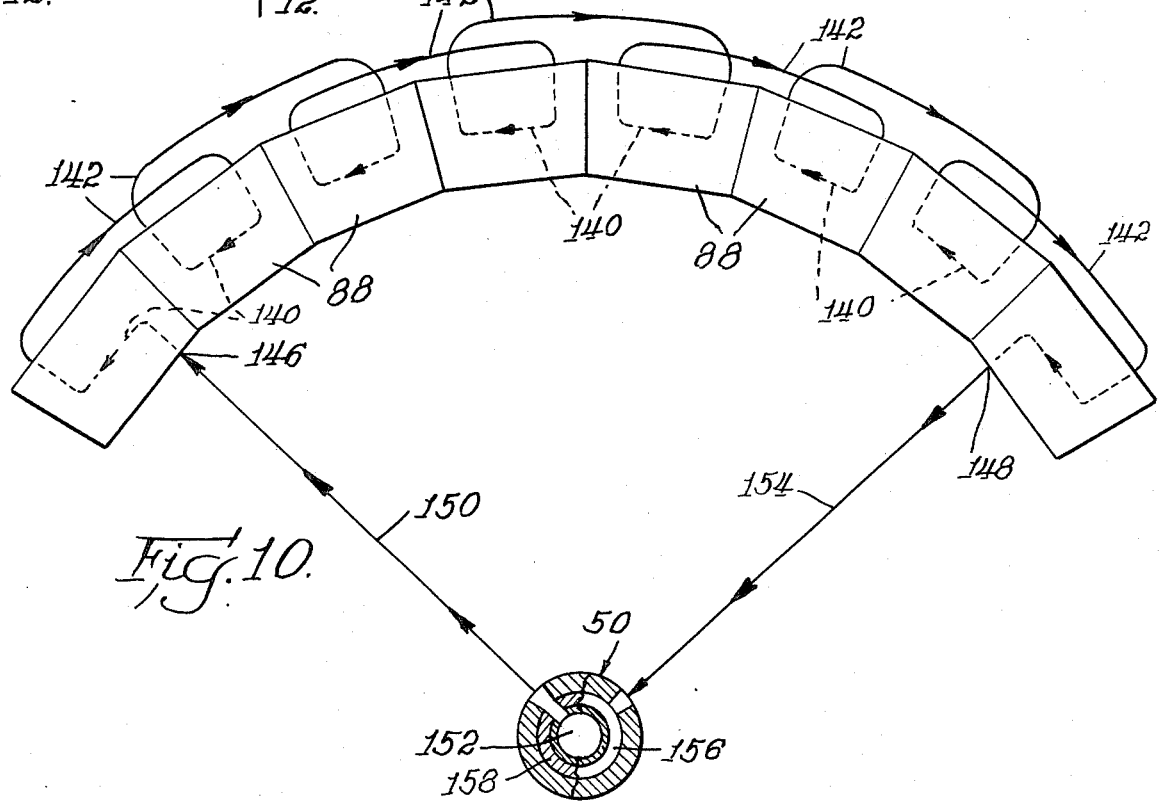
FIG. 10 is a schematic illustration of a group of mold sections joined into a cooling circuit.

As shown in FIG. 10, a series of the mold sections 88 (eight being illustrated) are grouped together in a single cooling circuit. With twenty-four mold sections 88 forming a full circle, three such cooling circuits formed. As best shown in FIG. 12, each of the mold sections 88 includes a pair of radial channels 136 and 138 interconnected by a chordal channel 140. A series of tubes or conduits 142 connect the channel 138 of one mold section 88 with the channel 136 of the next succeeding mold section 88. Thus, as shown schematically in FIG. 10, a continuous circuit is formed for fluid flow through the eight mold sections 88 of each grouping.

For convenience, each of the channels 136, 138 and 140 is bored through its respective mold section 88 as best shown in FIG. 12. For those portions of the channels 136 through 140 not requiring an inlet or or outlet, a series of plugs 144 are threadly seated within the channels as shown.

Each of the groupings of the mold sections 88, for cooling purposes, includes an inlet 146 and an outlet 148. The inlet 146 is connected to a tube 150 leading from an inlet conduit 152 formed within the central shaft 50. Similarly, each of the outlets 148 is connected to a tube 154 leading to an outlet conduit 156 formed within the central shaft 50. As illustrated in FIG. 7, the conduits 152 and 156 are concentric, and within the central shaft 50 are separated by a seal 158 which prevents mixing of cooler fluid within the inlet conduit 152 with the warmer fluid exiting through the outlet conduit 156.

As noted above, the central shaft 50 and hence the conduits 152 and 156, are mounted for rotation within the bearings 52. The inlet conduit 152 extends outwardly through the bearing 52 and is engaged within a supply 158. Similarly, the outlet conduit 156 extends outwardly from the bearing 52 and is connected to a return 160. The supply 158 and return 160 are in turn connected to the supply and return lines 20 (also shown in FIG. 1). The supply 158 and return 160 are stationary as opposed to the rotational conduits 152 and 156. Consequently, a rotational seal 162 is used to provide a fluid-tight seal between the conduit 152 and the supply 158. Similarly, a rotational seal 164 is employed to provide a seal between the rotational conduit 156 and the stationary return 160. The nature of the seals 162 and 164 forms no part of the invention, and any conventional seal may be employed.

As shown in FIGS. 8 and 9, three of the tubes 150, spaced at 120° intervals, lead from the inlet conduit 152 to a group of the mold sections 88 or 90 forming a single cooling circuit. Similarly, three tubes 154, spaced at 120° intervals lead from the outlet conduit 156 to the groups of mold sections 88 or 90. Since, as explained above, it is preferred that three groups of mold sections are employed for each of the mold sections 88 or 90 (or a total of 6 groups of mold sections), and with reference to FIG. 7, six of the inlet tubes 150 and six of the outlet tubes 154 would be employed to handle the inlet and outlet fluids from each of the six groups of mold sections 88 and 90. The spacing between the tubes 150 and 154 is preferably equal (thus within 120°) due to the spacing of the groups of mold sections 88 and 90.

Air is distributed to each blow mold from a manifold 166 shown in phantom in FIG. 7, and in greater detail in FIGS. 13 through 19. The air supply manifold 166 is composed of two basic portions, a stationary manifold portion 168 and a rotatable manifold portion 170. A mount 172 attached to an annular ring 174 secured to the bearing 54 is used to retain the stationary manifold portion 168 in place. The rotatable manifold portion 170 is mounted on the central shaft 50, and is aligned in proper registration with the plate 48 by means of a pin 176 secured within a keyway 178 formed in the manifold portion 170.

The mount 172 has a leg 180 which extends into a guide 182 formed in the stationary manifold portion 168. An annular piston 184 extends within an annular channel 186 formed in the manifold portion 168. Sealing rings 188 are installed in opposite sides of the piston 184 to seal the interface between the piston 184 and the channel 186. A cavity 190 is formed between the manifold portion 168 and the piston 184 so that, when air pressure is introduced into the cavity 190, the manifold portion 168 is urged against the manifold portion 170 to effect a seal. This is described below in somewhat greater detail in connection with the discussion of FIG. 19.

Each pair of mold sections 88 and 90 requires air pressure to perform three functions; first, that to be introduced between the piston 126 and the mold section 90 to effect the final pressure seal between the mold sections 88 and 90, second, that to extend the blowing needles and inflate the parisan during the blowing process, and third, that to retract each of the needles after the blowing operation has been completed. To that end, the rotatable manifold portion 170 includes a plurality of groups of air distribution conduits 192, 194 and 196, one group of conduits being present for each pair of mold sections 88 and 90. In the embodiment described, 24 such groups of conduits 192 through 196 are employed.

Each air distribution conduit 192 is connected to a tube 198 leading to the inlet 127 of the associated mold section pair 88 and 90. Therefore, pressurized air introduced into the conduit 192 creates air pressure behind the piston 126 (that is, between the piston 126 and the aperture in the carriage 96 in which the piston 126 is located) in order to effect a final and firm seal between the mold sections 88 and 90 when closed against one another. The conduit 194 is connected to a tube 200 which leads to the needle housing 132 of the associated pair of mold sections 88 and 90. Pressurized air in the tube 200 is used to extend the needle contained within the needle housing 132 and also supply air to blow the plastic parisan to form the container 134. Lastly, the conduit 196 is connected to a tube 202 which is also connected to the needle housing 132, but on the opposite side of the needle contained therein in order to retract the needle after the blowing operation.

Figure 13:
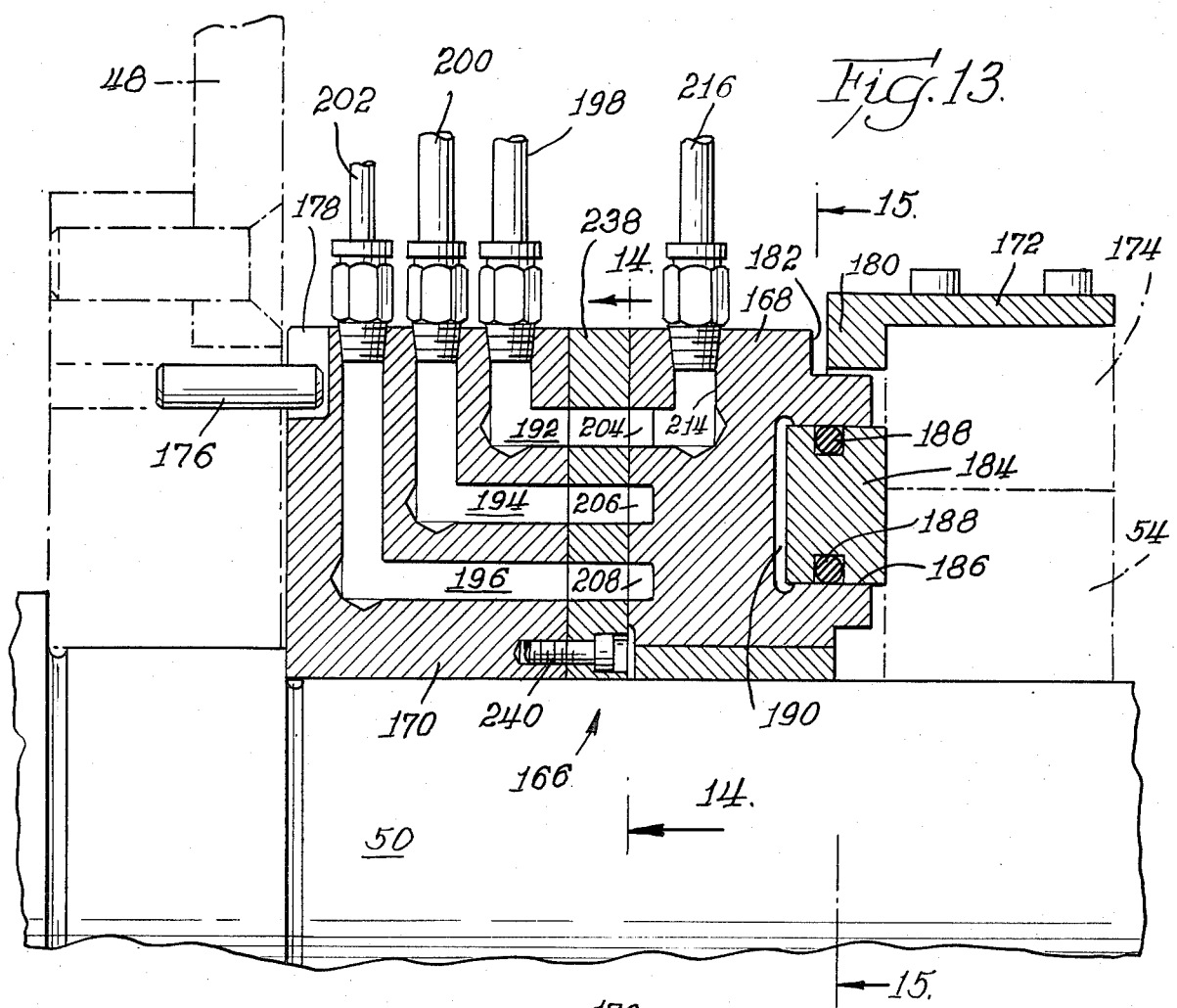
FIG. 13 is a cross-sectional illustration primarily of the air distribution manifold according to the invention.
Figure 15:
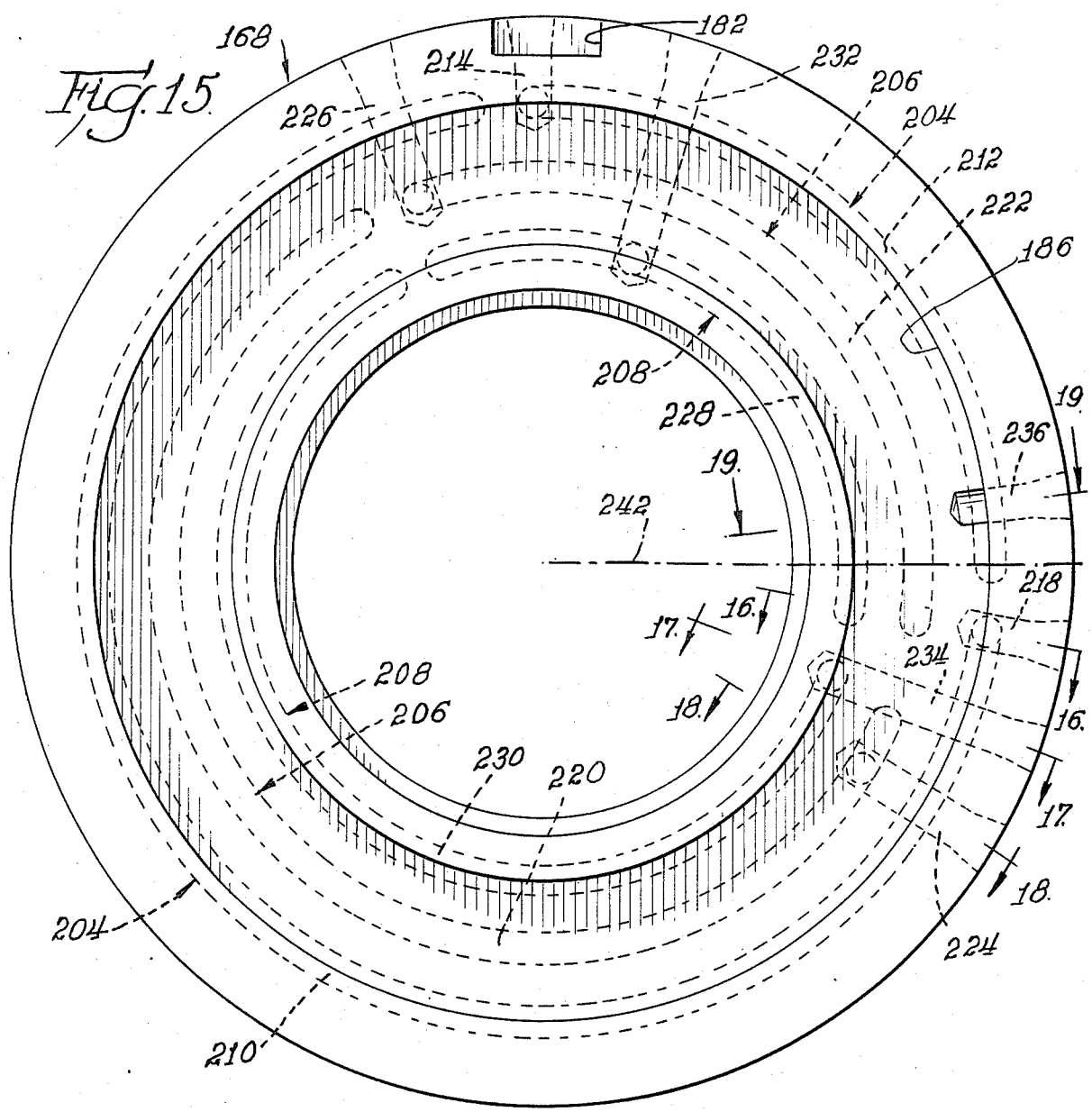
FIG. 15 is a cross-sectional view taken along lines 15—15 of FIG. 13 with portions omitted for clarity.

Air is introduced into the conduits 192, 194 and 196 by the stationary manifold portion 168. It is evident that air must be introduced into the conduits 192 through 196 at different times during rotation of the mold frame 42. For example, after the mold sections 88 and 90 are closed (at the 9:00 position in FIG. 2), air pressure is applied to the conduit 192. At the same time, or very shortly afterwards, the needle within the needle housing 132 is extended by air pressure applied to the conduit 194. However, no air pressure is applied into the conduit 196 until air pressure is relieved from the conduit 194. At that time, the needle is withdrawn from the container 134 in order to prepare for opening of the molds (at the 12:00 position in FIG. 2). At the time of opening, air must be relieved from the conduit 192 so that the mold sections 88 and 90 can be separated. The stationary manifold portion 168 therefore must provide the timing of application of air pressure to the conduits 192 through 196 in order to obtain the proper sequential operation just described. Turning to FIG. 15, and the cross-sections thereof in FIGS. 16 through 19, the manifold portions 168 has formed in the face thereof three annular channels 204, 206 and 208. The annular channel 204 includes a pressure segment 210 and an exhaust segment 212. The exhaust segment 212 is connected to an outlet conduit 214 which, as shown in FIG. 13, in turn is connected to a tube 216 in order to exhaust air within the exhaust segment 212. Similarly, the pressure segment 210 is connected to an inlet conduit 218 which, in a similar fashion to the outlet conduit 214, is connected to a tube (not illustrated) which is directed to a source of pressurized air (not illustrated, but see the schematic of FIG. 20). Thus, pressurized air will be available in the pressure segment 210 over its entire length which, as shown in FIG. 15, extends for approximately 250°.

The annular channel 206 also includes two portions, a pressure segment 220 and an exhaust segment 222. The pressure segment 220 is connected to an inlet conduit 224 which, in a manner identical to that of the inlet conduit 218 of the pressure segment 210, is connected to a tube leading to a source of air pressure. The exhaust segment 222 is connected to an outlet conduit 226 which, in a fashion identical to the outlet conduit 214, may be connected to a tube which is vented to the atmosphere, as desired.

Finally, the annular channel 208 is also comprised of two segments, a pressure segment 228 and an exhaust segment 230. The pressure segment 228 is connected to an inlet conduit 232 which, in a fashion identical to the inlet conduit 218, leads to a source of pressurized air (not illustrated). Finally, the exhaust segment 230 is connected to an outlet conduit 234 which, in a fashion identical to the outlet conduit 214, may be connected to a tubing or vented to the atmosphere, as desired.

Figures 16, 17, 18, 19:
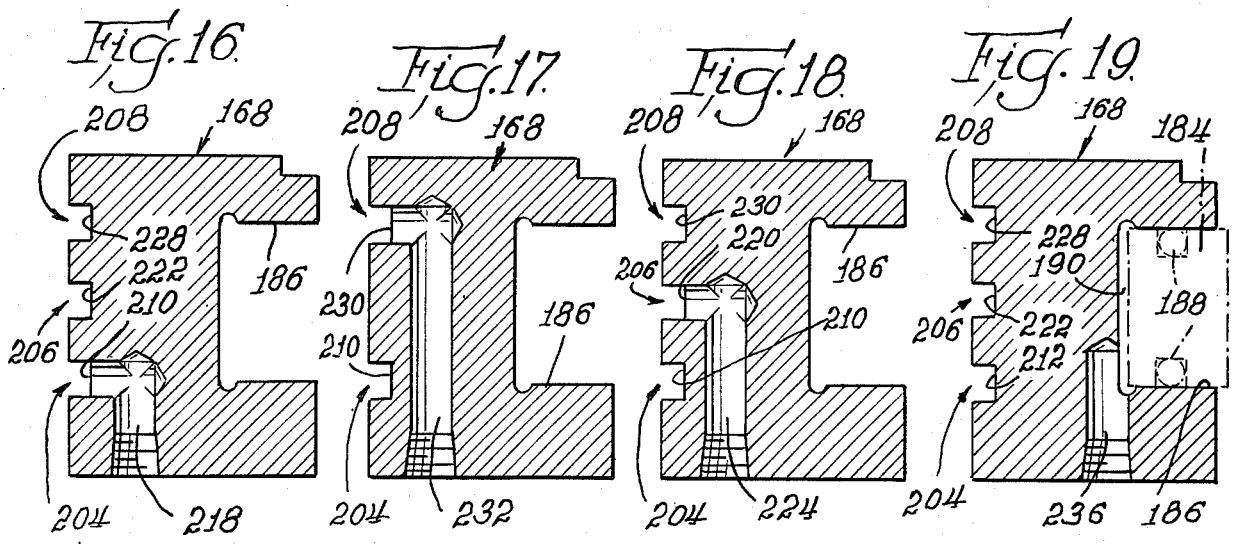
FIG. 16 is a cross-sectional view taken along lines 16—16 of FIG. 15.
FIG. 17 is a cross-sectional view taken along lines 17—17 of FIG. 15.
FIG. 18 is a cross-sectional view taken along lines 18—18 of FIG. 15.
FIG. 19 is a cross-sectional view taken along lines 19—19 of FIG. 15.

Also bored in the manifold portion 168 is a final inlet conduit 236 which, as shown in FIG. 19, is connected to the annular cavity 190 of the piston 184. In a fashion similar to the other inlet conduits of the manifold portion 168, the inlet conduit 236 is connected to a source of air pressure and is pressurized only when the mold sections 88 and 90 are closed against one another in order to effect a proper and complete seal between the two mold sections 88 and 90. Although the inlet conduit 236 extends beneath the exhaust segment 212 as shown in FIG. 15, it does not connect with the segment 212, as best shown in FIG. 19.

In order to accommodate wear as the manifold portion 170 rotates against the face of the manifold portion 168, and also to assure an adequate seal between the two manifold portions 168 and 170, a wear plate or seal 238 is attached to the manifold portion 170 by means of a plurality of bolts 240. Of course, if desired, the plate 238 may be omitted and the manifold portions 168 and 170 may contact one another. The wear plate 238 is provided with apertures which directly align with the various groups of conduits 192 through 196.

Figure 14:
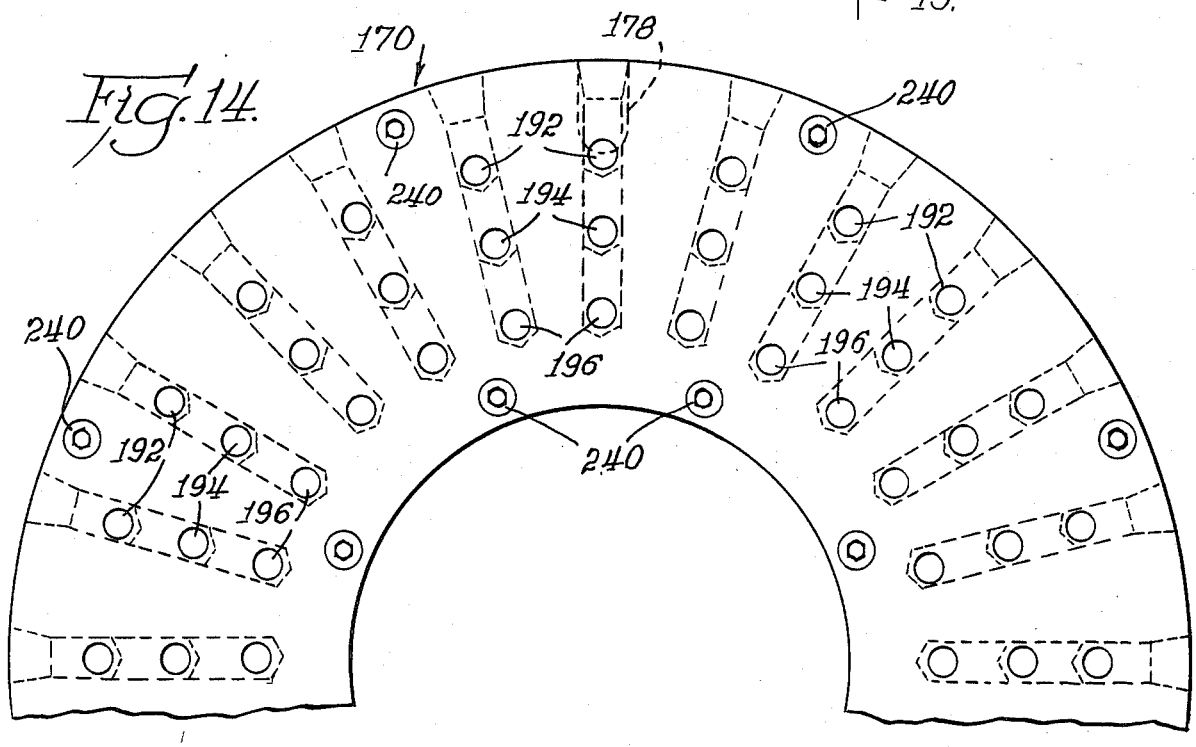
FIG. 14 is a cross-sectional illustration taken along lines 14—14 of FIG. 13.

As explained above, each of the groups of conduits 192 through 196 leads to tubes which perform the needle extension and blowing functions, needle retraction functions and final mold closing and sealing functions. The functioning of the blow molding machine 10 in view of the rotation of one of the groups of conduits 192 through 196 against the face of the manifold portion 168 is described below, it being evident that the experiences of each succeeding group of conduits 192 through 196 would be identical. It should also be noted that the orientation of the two manifold portions 168 and 170 shown in FIGS. 14 and 15 is the mirror image of the mold frame 42 of FIG. 2 because the manifold portions 168 and 170 are mounted on the opposite side from the orientation shown in FIG. 2. Thus, while rotation in FIG. 2 is counter-clockwise, rotation of the manifold portion 170 against the manifold portion 168 is clockwise relative to FIG. 15.

The starting poin for operating is at the 3:00 position in Figure 15, shown schematically by a dotted line 242. At this orientation, the conduits 194 and 196 are connected to the exhaust segment 222 and the pressure segment 228, respectively. Thus, the needle within the needle housing 132 is retracted. The conduit 192 is, at this location, just leaving communication with the exhaust segment 212, and therefore no air pressure is applied to the internal piston 126. As rotation continues in the clockwise direction, approximately 8° later, the conduit 192 begins communication with the pressure segment 210. Air is directed to the associated internal piston 126 to therefore lock together the two mold sections 88 and 90. Rotation just over 10° farther (to about the 3:30 position) permits communication of the conduit 196 with the exhaust segment 230. Thus, no retraction pressure is directed to the needle of the needle housing 132. Approximately 10° of rotation further (at about the 4:00 position), the conduit 194 begins communication with the pressure segment 220. Thus, the needle within the associated needle housing 132 is placed under pressure to extend, and the molten parison within the closed mold portions 88 and 90 is inflated.

After rotation over about an additional 160° (or to approximately the 11:00 position), the conduit 194 is removed from communication with the pressure segment 220, and the conduit 208 is removed from communication with the exhaust segment 208. Rotation a few degrees farther permits communication of the conduit 194 with the exhaust segment 206 and the conduit 196 with the pressure segment 228. Therefore, the needle within the needle housing 132 is retracted.

As rotation continues to almost the 12:00 position, the conduit 192 leaves communication with the pressure segment 210. At the 12:00 position, the conduit 192 communicates with the exhaust segment 212, releaving pressure on the internal piston 126 and permitting opening of the mold portions 88 and 90. At the same time, the conduit 194 remains in communication with the exhaust segment 222 and the conduit 196 remains in communication with the pressure segment 228. Those conditions remain until a full revolution is completed at the line 242, and the sequence of operation is then repeated as rotation continues.

Figure 20:
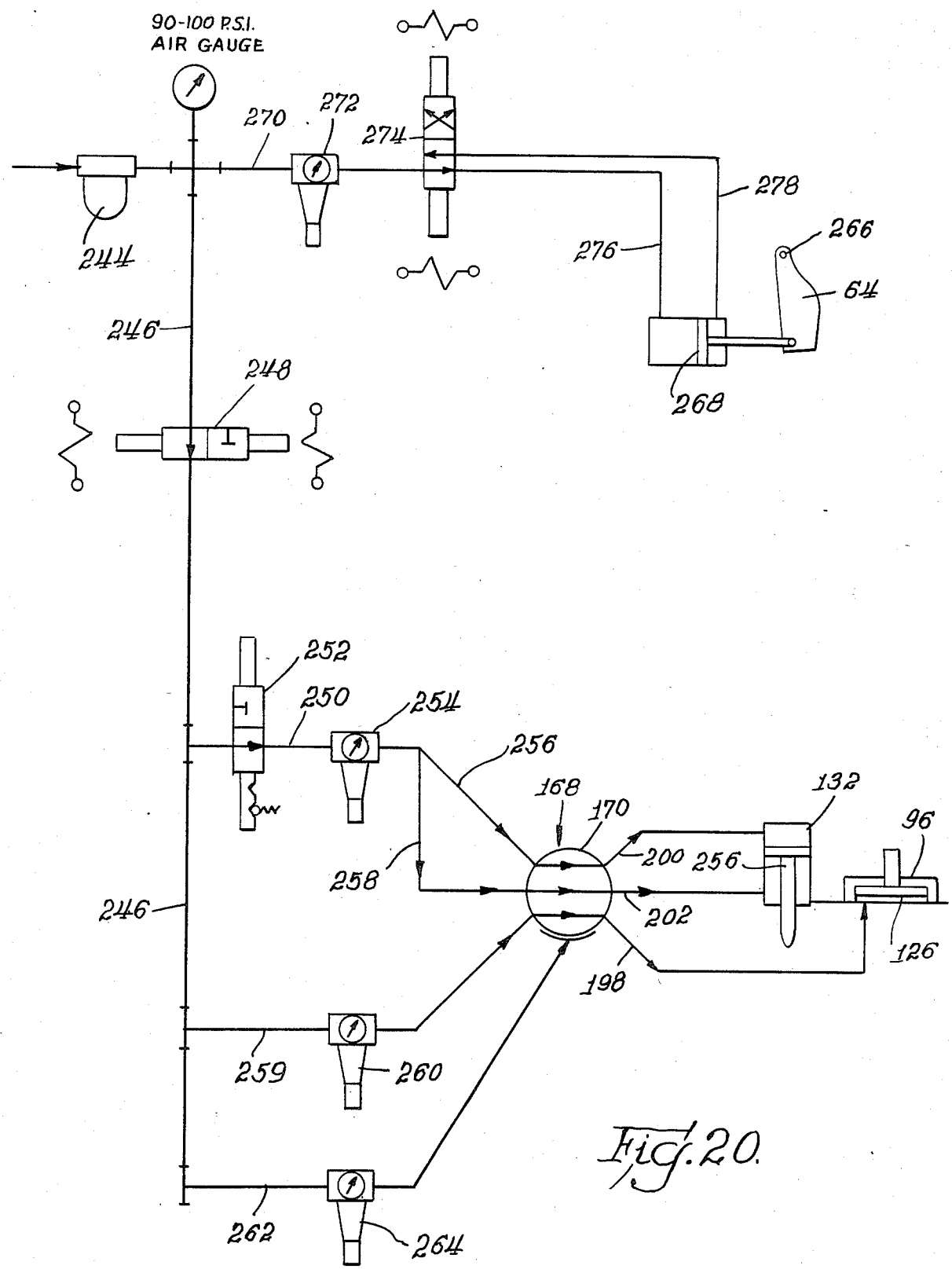
FIG. 20 is a schematic representation of the pneumatic elements of the invention.

A schematic illustration of the pneumatic components of the invention is illustrated in FIG. 20. Air from a conventional source (not illustrated) passes through a filter 244 to a line 246. A solenoid activated latching valve 248 is installed in the line 246 to either permit air flow or halt air flow along the line 246. The orientation shown permits air flow beyond the valve 248 and by activation of conventional solenoids associated with the valve 248, which itself may be conventional, the air flow in the line 246 may be halted.

The line 246 is tapped by a line 250 which includes a manual flow valve 252 which, similar to the valve 248, is used to either permit flow along the line 250 or halt further flow. A pressure regulator and gauge 254 is installed in the line 250 which is bisected into lines 256 and 258 leading to the stationary manifold portion 168. The line 256 would be connected to the conduit 224 (FIG. 15), while the line 258 would be connected to the conduit 232. Distribution through the rotatable manifold portion 170 then continues as described above, with pressure in the tube 200 being directed to extend a needle 256 within the needle housing 132 and also blow the plastic parison contained between the closed mold portions 88 and 90. Similarly, air in the line 202 is directed as described above to retract the needle 256 within the needle housing 132.

The line 246 is also tapped by a line 259 which includes a pressure regulator and gauge 260. Line 259 then continues to the stationary manifold portion 168, being connected to the inlet conduit 218. From the rotatable manifold portion 170, the tube 198 leads to the internal piston 126 to pressurize the junction of the mold portions 88 and 90 to maintain the mold portions in a closed orientation for the duration described above.

The line 246 is also tapped by a line 262 which passes through a pressure regulator and gauge 264 to the stationary manifold portion 168 where it communicates with the inlet conduit 236 to pressurize the piston 184 (FIGS. 13 and 19).

At times, it may be desired to prevent closing of the mold portions 88 and 90 during rotation of the rotary mold frame 42 in order to permit inspection of the molding machine 10 with the mold portions open while rotating. If so desired, the cam segment 64 may be connected for pivoting about a pivot 266 as shown in FIG. 20, with an opposite end of the cam segment 64 connected to a piston 268. A line 270 beads from the filter 244 through a pressure regulator and gauge 272 to a latching air valve 274. The line then splits into lines 276 and 278 connected on opposite side of the piston 268. As shown schematically in FIG. 20, air pressure in the line 276 extends the piston 268 while air pressure in the line 278 retracts the piston 268. In the orientation illustrated, the line 278 is exhausted to the atmosphere, and if the orientation of the air valve 274 is changed by activating the solenoids thereof, the opposite line orientation occurs where line 274 is under pressure and line 276 is exhausted to the atmosphere. Thus, by judicious operation of the air valve 274, the cam segment 64 can be pivoted to either cause closing of the respective mold sections 88 and 90 in the manner described above, or can be withdrawn to prevent their closing.

The present invention produces a rotary blow molding machine which can be operated at high rotational speeds, thus producing many hundreds of the containers 134 in an hour's time. In order to automate the system, and as described briefly above with regard to FIG. 1, the containers 134 must be trimmed after their formation. As shown in FIG. 21, the trimmer 22 (FIG. 1) includes a pair of knives 280 and 282 which engage the container 134 as it is conveyed through the trimmer 22. The top 286 of the container 134 is severed by the knives 280 and 282 as the container is rotated by the belt 284, and is passed into the hopper 26 for return in the line 28 to the regrinder 30. The container 134, minus the top 286, may then be collected with other such containers or may be conveyed onwardly for automatic filling and sealing.

Various changes may be made to the invention without departing from the spirit thereof or scope of the following claims.

What is claimed is:

1. A multi-station rotary blow molding machine having a rotary frame and a stationary support frame, comprising
   a. a plurality of separable blow molds angularly arranged in a circular array in said mold frame about a central shaft having a central axis, each mold comprising a pair of mold sections each having an internal cavity with the internal cavities of said mold sections, when joined, defining the external configuration of a molded article,
   b. means mounting said mold sections in said mold frame for movement toward and away from one another in a direction generally parallel to the axis of said central shaft,
   c. means for opening and closing the mold sections of each pair of mold sections, said means for opening and closing including:
      i. a toggle having a central pivot attached to said mold frame,
      ii. a pivotable arm located between each mold section and each toggle, said arm having a first pivot attached to said mold section and a second pivot attached to one end of said toggle, and in which said toggle is pivotally positionable about said central pivot in one of two orientations, a first orientation at which said second pivot is raised and said mold sections are opened away from one another, and a second orientation at which said second pivot is lowered and said mold sections are closed against one another, said second orientation being an over-the-center orientation such that the center of said second pivot is passed through a line connecting the center of the first pivot and the central pivot when said toggle is pivoted from said first orientation to said second, and
      iii. means in said second orientation for urging said mold sections into intimate contact with one another,
   d. air distribution means for supplying air for blowing articles and controlling certain portions of the molding machine, said air distribution means including an air supply manifold having means for supplying air for predetermined portions of a revolution of said rotary mold frame,
   e. means for cooling each mold section, said cooling means including an internal fluid path in each mold section and means interconnecting the internal paths of adjacent mold sections for passing cooling fluid serially between adjacent mold sections, certain adjacent mold sections being grouped into a cooling circuit and said cooling means including a plurality of said cooling circuits, each cooling circuit including an inlet for fresh cooling fluid and an outlet for expended cooling fluid, and
   f. means for rotating said mold frame.

2. A rotary blow molding machine according to claim 1 in which said mounting means for each pair of mold sections comprises a pair of spaced rods secured to said mold frame and a carriage for each mold section, said carriage being connected to and slideable upon said spaced rods.

3. A rotary blow molding machine according to claim 2 in which each mold section is removably fastened to an associated carriage.

4. A rotary blow molding machine according to claim 1 in which said means for opening and closing includes a cam attached to said support frame, a cam follower associated with each pair of mold sections, said cam follower being complementary to said cam and carried by said mold frame, and means linking each said cam follower to one toggle of said associated pair of mold sections.

5. A rotary blow molding machine according to claim 4 in which said cam comprises a segmented cam track, a first segment of said track being shaped to cause closing of each pair of mold sections, and a second segment of said track spaced from said first segment being shaped to cause opening of each pair of mold sections.

6. A rotary blow molding machine according to claim 5 including a shiftable cam track segment interposed between said first and second segments, said shiftable cam track segment normally being located in a position preventing engagement with each said cam follower, and including means to relocate said shiftable cam track segment to engage each said cam follower and open each pair of mold sections before engagement by said second segment of said track.

7. A rotary blow molding machine according to claim 4 in which said linking means includes a rotatable tie rod secured to each said cam follower and extending through said mold frame between each said pair of mold sections, and including a linkage between said tie rod and each mold section of said pair of mold sections.

8. A rotary blow molding machine according to claim 1 in which said manifold includes a stationary first portion secured to said support frame and a rotatable second portion secured to said mold frame.

9. A rotary blow molding machine according to claim 8 including means for urging said first portion into sealing engagement with said second portion.

10. A rotary blow molding machine according to claim 9 in which said manifold is annular, and in which said urging means comprises an annular piston disposed within an annular channel in said first portion, said piston bearing against said support frame, and including means to introduce pressurized air between said piston and said channel to force said first portion against said second portion.

11. A rotary blow molding machine according to claim 8 including a seal between said first and second portions.

12. A rotary blow molding machine according to claim 8 in which said first portion includes a plurality of annular channels communicating with said second portion.

13. A rotary blow molding machine according to claim 12 in which each said annular channel includes a pressure segment and an exhaust segment, each segment occupying a predetermined sector of each annular channel.

14. A rotary blow molding machine according to claim 8 in which said second portion includes a plurality of spaced groups of air distribution conduits, each said group being associated with one of said blow molds.

15. A rotary blow molding machine according to claim 8 in which said first portion includes means for furnishing air to said second portion over at least one particular sector thereof, and in which said second portion includes means in registration with said furnishing means for providing air individually to each said blow mold.

16. A rotary blow molding machine according to claim 15 in which said furnishing means comprises at least one annular channel having a pressure segment extending across said particular sector.

17. A rotary blow molding machine according to claim 15 in which said means in registration with said furnishing means comprises a plurality of spaced air distribution conduits, at least one of said conduits being associated with one of said blow molds.

18. A rotary blow molding machine according to claim 1 in which said means for rotating comprises a motor attached to said support frame and drivingly connected to said mold frame by an endless belt.

19. A rotary blow molding machine according to claim 1 in which said means for urging comprises a fluid-activated piston bearing between one of said mold sections and the pivotable arm attached to said mold section.

20. A multi-station rotary blow molding machine having a rotary mold frame and a stationary support frame in which said mold frame is mounted for rotation, comprising
　a. a plurality of adjoining, separable blow molds angularly arranged in a serial fashion in a circular array in said mold frame about a central shaft having a central axis, each mold comprising a pair of complementary mold sections each having an internal cavity with the internal cavities of said mold sections, when joined, defining the external configuration of a molded article,
　b. means mounting said mold sections in said mold frame for movement toward and away from one another in a direction generally parallel to the axis of said central shaft, said mounting means including a carriage for each mold section,
　c. means for opening and closing the mold sections of each pair of mold sections, said means for opening and closing including:
　　i. a toggle having a central pivot attached to said mold frame,
　　ii. a pivotable arm located between each mold section and each toggle, said arm having a first pivot attached to said mold section and a second pivot attached to one end of said toggle, and in which said toggle is pivotally positionable about said central pivot in one of two orientations, a first orientation at which said second pivot is raised and said mold sections are opened away from one another, and a second orientation at which said second pivot is lowered and said mold sections are closed against one another, said second orientation being an over-the-center orientation such that the center of said second pivot is passed through a line connecting the center of the first pivot and the central pivot when said toggle is pivoted from said first orientation to said second, and
　　iii. means in said second orientation for urging said mold sections into intimate contact with one another,
　d. air distribution means for supplying air for blowing articles and controlling certain portions of the molding machine, said air distribution means including an air supply manifold having means for supplying air to each of said mold sections for predetermined portions of a revolution of said rotary mold frame,
　e. means for cooling each mold section, said cooling means including an internal fluid path in each mold section and mean interconnecting the internal paths of adjacent mold sections for passing cooling fluid serially between adjacent mold sections, certain adjacent mold sections being grouped into a cooling circuit and said cooling means including a plurality of said cooling circuits, each cooling circuit including an inlet for fresh cooling fluid and an outlet for expended cooling fluid, and
　f. means mounted in said support frame for rotating said mold frame, 21. A rotary blow molding machine according to claim 20 in which said mounting means includes a pair of spaced rods secured to said mold frame, said carriages being connected to and slideable upon said spaced rods.

22. A rotary blow molding machine according to claim 20 in which said means for opening and closing includes a cam attached to said support frame, a cam follower associated with each pair of mold sections, said cam follower being complementary to said cam and carried by said mold frame, and means linking each said cam follower to one toggle of said associated pair of mold sections.

23. A rotary blow molding machine according to claim 22 in which said cam comprises a segmented cam track, a first segment of said track being shaped to cause closing of each pair of mold sections, and a second segment of said track spaced from said first segment being shaped to cause opening of each pair of mold sections.

24. A rotary blow molding machine according to claim 22 in which said linking means includes a rotatable tie rod secured to each said cam follower and extending through said mold frame between each said pair of mold sections, and including a linkage between said tie rod and each mold section of said pair of mold sections.

25. A rotary blow molding machine according to claim 20 in which said manifold includes a stationary first portion secured to said support frame and a rotatable second portion secured to said mold frame.

26. A rotary blow molding machine according to claim 25 in which said first portion includes means for furnishing air to said second portion over at least one particular sector thereof, and in which said second portion includes means in registration with said furnishing means for providing air individually to each said blow mold.

27. A rotary blow molding machine according to claim 26 in which said furnishing means comprises at least one annular channel having a pressure segment extending across said particular sector.

28. A rotary blow molding machine according to claim 20 in which said means for urging comprises a fluid-activated piston bearing between one of said mold sections and the pivotable arm attached to said mold section.

* * * * *